United States Patent [19]

Martin

[11] 4,046,795

[45] Sept. 6, 1977

[54] PROCESS FOR PREPARING THIOFUNCTIONAL POLYSILOXANE POLYMERS

[75] Inventor: Eugene Ray Martin, Onsted, Mich.

[73] Assignee: SWS Silicones Corporation, Adrian, Mich.

[21] Appl. No.: 630,475

[22] Filed: Nov. 10, 1975

[51] Int. Cl.$^2$ .............................. C07F 7/08; C07F 7/18
[52] U.S. Cl. ...................... 260/448.2 E; 260/448.2 N; 260/448.8 R; 260/46.5 E
[58] Field of Search ................. 260/448.2 E, 448.8 R, 260/448.2 N

[56] References Cited

U.S. PATENT DOCUMENTS

| 3,388,144 | 6/1968 | Musof et al. | 260/448.8 R |
|---|---|---|---|
| 3,392,182 | 7/1968 | Koerner | 260/448.8 R |
| 3,655,713 | 4/1972 | LeGrow | 260/448.2 N |
| 3,957,844 | 5/1976 | Mui | 260/448.2 E |

*Primary Examiner*—Paul F. Shaver

[57] ABSTRACT

The invention relates to a process for preparing thiofunctional polysiloxane polymers which comprises reacting a disiloxane and/or a hydroxy or hydrocarbonoxy containing silane or siloxane with a cyclic trisiloxane in the presence of an acid catalyst wherein at least one of the above organosilicon compounds contain a thiol group. These thiofunctional polysiloxane polymers are useful as metal protectants and as release agents, especially on metal substrates.

22 Claims, No Drawings

PROCESS FOR PREPARING THIOFUNCTIONAL POLYSILOXANE POLYMERS

The present invention relates to polysiloxane polymers and more particularly to thiofunctional polysiloxane polymers and to a method for preparing the same.

Heretofore, sulfur containing compounds have been prepared by reacting hydroxyl-terminated dimethylpolysiloxane fluids with a methoxy containing silacyclopentane thiol in the presence of an acid clay to affect the condensation reaction of the sulfur containing silane and the dimethylpolysiloxane (See U.S. Pat. No. 3,655,713 to Le Grow). In the condensation reaction, the acid clay not only catalyzes the condensation between the methoxy groups of the sulfur containing compound and the hydroxyl groups of the dimethylpolysiloxane but also catalyzes the condensation between hydroxyl groups to form a mixture of compounds. Furthermore, the process requires that a preformed hydroxyl-terminated dimethylpolysiloxane fluid be prepared prior to the condensation reaction.

Also, U.S. Pat. No. 3,346,405 to Viventi discloses a process for preparing sulfur containing siloxanes by reacting sodium sulfohydride with w-chloroalkyl containing organopolysiloxanes in the presence of dimethylformamide. Another patent which describes sulfur containing organopolysiloxanes is U.S. Pat. No. 2,960,492 to Morton et al. which discloses reacting a vinyl containing siloxane with a mercaptan to form an adduct therewith by combining the sulfohydride group with the unsaturated vinyl group of the siloxane. U.S. Pat. No. 3,388,144 to Musolf et al. discloses reacting a siloxane containing one or two mercaptoalkyl groups per silicon atom with a polyhydroxylated carbon compound containing an unsaturated olefin group in the presence of a peroxide catalyst.

The above described processes for preparing thiofunctional siloxane polymers have several disadvantages. For example, long reaction times are required. Also, siloxanes having chloroalkyl groups or vinyl unsaturation are required as one of the reactants. Moreover, it is very difficult to obtain complete conversion of the chloroalkyl groups or vinyl groups to thiofunctional groups, thus polymers having both functional groups are obtained from the above processes.

Therefore, it is an object of this invention to provide a method for preparing thiofunctional polysiloxane polymers which do not require vinyl unsaturation or chloroalkyl substituents. Another object of this invention is to provide a method for preparing thiofunctional polysiloxanes which require shorter reaction times at lower temperatures. A further object of this invention is to provide a method for preparing a broad spectrum of thiofunctional siloxanes from disiloxanes and cyclic trisiloxanes. A still further object is to prepare thiofunctional siloxanes free of residual chloroalkyl or vinyl groups.

The foregoing objects and others which will become apparent from the following description are accomplished in accordance with this invention, generally speaking, by providing a method for preparing thiofunctional polysiloxanes which comprises affecting a reaction between a disiloxane and/or a hydroxy or hydrocarbonoxy containing silane or siloxane with a cyclic trisiloxane in the presence of an acid catalyst in which at least one of the above organosilicon compounds contain a thiol group. Surprisingly, it has been found that the present process is specific for cyclic trisiloxanes even though catalysts capable of affecting the polymerization of other cyclic siloxanes are employed in this process.

Organopolysiloxanes which may be used in this invention are cyclic siloxanes of the formula

wherein R which may be the same or different, represents a monovalent hydrocarbon radical or a halogenated monovalent hydrocarbon radical having up to 18 carbon atoms, M is a group represented by the formulae $R'(SR''')_y$ and

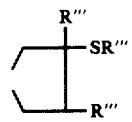

$a$ is a number of from 0 to 6 and $y$ is a number of from 1 to 3.

Suitable examples of organosilicon compounds which may be reacted with the cyclic trisiloxanes or mixtures of cyclic trisiloxanes and disiloxanes of the formula

are silanes of the general formula

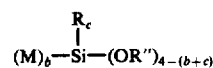

or siloxanes of the general formula

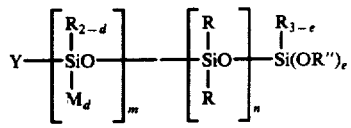

in which R is a monovalent hydrocarbon radical or a halogenated hydrocarbon radical having from 1 to 18 carbon atoms, M is a group represented by the formula $R'(SR''')_y$ and

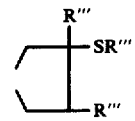

R' is substituted or unsubstituted divalent, trivalent or tetravalent hydrocarbon radicals free of aliphatic unsaturation having from 1 to 18 carbon atoms, hydrocarbon ether, hydrocarbon thioether, hydrocarbon ester, and hydrocarbon thioester radicals in which R' is attached to the silicon atom via a silicon-carbon bond, R" is hydrogen or a monovalent hydrocarbon radical having from 1 to 18 carbon atoms, R''' which may be the same as R" or a radical represented by the formula R''''X, wherein X is

—OOCR, OH or a cyanoalkyl radical, wherein R'''' is a divalent hydrocarbon radical free of aliphatic unsaturation having from 1 to 18 carbon atoms, Y is a radical of the formula $R_3SiO_{1/2}$, and

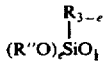

where R and R'' are the same as above, $b$ is a number of from 0 to 3, $c$ is a number of from 0 to 3 and the sum of $b+c$ is a number up to 3, $d$ is a number of from 0 to 2, $e$ is a number of from 1 to 3, $m$ and $n$ are each equal to a number of from 0 to 999 and the sum of $m+n$ is at least 1.

Examples of suitable monovalent hydrocarbon radicals represented by R are alkyl radicals such as methyl, ethyl, propyl, butyl, pentyl, hexyl, octyl, decyl, octadecyl; aryl radicals such as phenyl, diphenyl and naphthyl; alkaryl radicals such as tolyl, xylyl and ethylphenyl; aralkyl radicals such as benzyl, α-phenylethyl, B-phenylethyl, α-phenylbutyl and cycloalkyl radicals such as cyclobutyl, cyclopentyl and cyclohexyl radicals; halogenated hydrocarbon radicals such as chloromethyl, bromoethyl, tetrafluoroethyl, fluoroethyl, trifluorotolyl, hexafluoroxylyl and the like.

Examples of suitable divalent hydrocarbon radicals represented by R' and R'''' are ethylene, trimethylene, tetramethylene, hexamethylene, octamethylene and the like. Suitable examples of trivalent and tetravalent hydrocarbon radicals are represented by the formula =CHCH₂—, =CHCH₂CH₂—, =CH(CH₂)₃—, =CH(CH₂)₄—, =CH(CH₂)₁₇—,

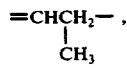

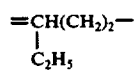

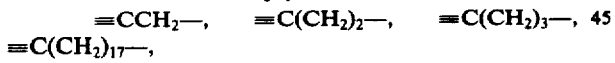

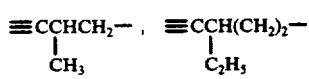

and the like.

Suitable examples of monovalent hydrocarbon radicals represented by R'' are alkyl radicals such as methyl, ethyl, propyl, butyl, pentyl, hexyl, octyl, decyl, octadecyl; aryl radicals such as phenyl, diphenyl and naphthyl; alkaryl radicals such as tolyl, xylyl and ethylphenyl; aralkyl radicals such as benzyl, α-phenylethyl, B-phenylethyl, α-phenylbutyl and cycloalkyl radicals such as cyclobutyl, cyclopentyl and cyclohexyl.

Suitable examples of R'(SR''')ᵧ groups include —CH₂SH, —C₂H₄SH, —C₃H₆SH, —CH₂SC₄H₉, —C₂H₄SC₂H₅, —C₃H₅SC₆H₅, (HSCH₂)₂CHCH₂CH₂—, (HSCH₂CH₂)(HSCH₂)CH(CH₂)₄—, (HSCH₂CH₂)₃CCH₂CH₂—, (HSCH₂CH₂)(HSCH₂)CHCH(CH₂SH)CH₂CH₂CH₂—, HS(CH₂)₅CH(CH₂CH₂SH)CH₂CH₂CH(CH₂CH₃)—, (HSCH₂CH₂)₂CHCH₂CH₂—,
(HSCH₂)₂CHSCH₂CH₂CH₂—,
(HSCH₂)₂(C₂H₅)CCH₂SCH₂CH₂CH₃—,
(HSCH₂)₃CCH₂SCH₂CH₂CH₂—,
(HSCH₂)(HSCH₂CH₂CH₂CH₂)CHSCH₂CH₂CH₂—,
(HSCH₂CH₂)₂CHCH₂SCH₂CH₂CH₂—,
(HSCH₂)₂(C₂H₅)CCH₂SCH₂CH₂S(CH₂)₃—,
(HSCH₂)₃CCH₂S(CH₂)₃S(CH₂)₃—,

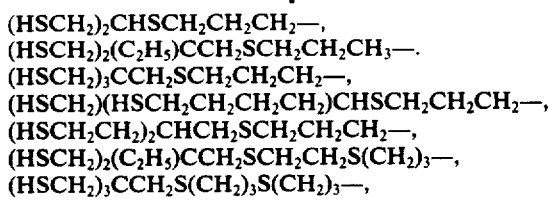

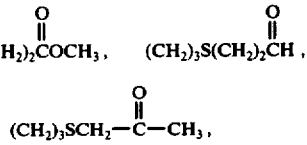

(CH₂)₃S(CH₂)₂CN and the like.

Hydroxy and hydrocarbonoxy containing silanes which may be employed in this invention are silanes such as 3-mercaptopropyl-trimethoxysilane, 2-mercaptoethyltriethoxysilane, w-mercaptodecyl-triethoxysilane, w-mercaptohexyltripropoxysilane, w-mercaptoamyl-triethoxysilane, 2-(triethoxysilyl)ethyl butyl thioether, 3-(trimethoxysilyl)propyl butyl thioether, 4-(triethoxysilyl)butyl methyl thioether, 2-(methyldiethoxysilyl)ethyl methyl thioether, 2-(methyldiethoxysilyl)ethyl phenyl thioether, 2-(methyl diethoxysilyl)ethyl dodecyl thioether, 6-(trimethoxysilyl)hexyl ethyl thioether, methyltriethoxysilane, dimethyldiethoxysilane, trimethylethoxysilane, dimethylsilane diol, diphenylsilane diol and the like.

Also, the corresponding siloxanes or copolymers thereof which contain at least one or more alkoxy or hydroxy groups may be employed in this invention. Suitable examples of these polysiloxanes are monoethoxy endblocked beta-mercaptoethylpropylpolysiloxane or methyldiethoxy silyl endblocked beta-mercaptobutyl-methylpolysiloxane, monohydroxy endblocked beta-mercaptoethyl methyl polysiloxane, dihydroxy endblocked dimethylpolysiloxane, diethoxy-endblocked dimethylpolysiloxane.

These polysiloxanes may be prepared either by the cohydrolysis and condensation of trialkylalkoxysilanes with thiol containing organopolysiloxanes or by the equilibration of cyclic thiol containing organopolysiloxanes with silicon atoms containing predominantly silicon-bonded alkoxy groups.

Other hydroxy and/or hydrocarbonoxy silicon compounds which may be employed as one of the initial reactants with the disiloxane and/or cyclic trisiloxane are the silacyclopentane thiol compounds disclosed in U.S. Pat. No. 3,655,713 to Le Grow.

Examples of suitable siloxanes are disiloxanes such as hexamethyldisiloxane, hexaethyldisiloxane, hexapropyldisiloxane, hexaoctyldisiloxane, di-(3-mercaptopropyl)tetramethyldisiloxane and the like. Examples of cyclic siloxanes which may be used in this invention are hexamethylcyclotrisiloxane, hexaethyltrisiloxane, hexaphenyltrisiloxane, hexabutyltrisiloxane, hexaoctyltrisiloxane, 1,2,3-trimethyl-1,2,3-triphenylcyclotrisiloxane and the like.

The compositions of this invention are prepared by affecting a reaction between a disiloxane and/or a hydroxy and/or a hydrocarbonoxy containing silane or siloxane with a cyclic trisiloxane wherein at least one of the compounds contain a thiol group in the presence of acid catalysts.

Catalysts which may be employed in affecting the reaction are acid clays and organic and inorganic acids having a pK value less than 1.0 and more preferably below 0.7 in aqueous solutions. Suitable acid catalysts which may be employed are benzosulfonic acid, paratoluenesulfonic acid, sulfuric acid, sulfurous acid, nitric acid, perchloric acid, hydrochloric acid and acid clays such as Filtrol No. 13 and No. 24 (available from Filtrol Corporation).

Although the amount of catalyst is not critical, it is preferred that from about 0.003 percent up to about 10 percent by weight of catalyst based on the total weight of the reactants, i.e., silane and siloxane be employed in the reaction to make the thiofunctional composition. Greater amounts of catalyst may be used; however, it is the intent of this invention to provide a catalyst system which does not alter the functionality of the resultant composition.

Generally, it is desirable to remove or destroy the catalysts after the reaction is complete because their presence will adversely affect the properties of the resulting polymer. The catalysts may be removed, for example, by washing with water or they may be destroyed by neutralizing with basic reagents. In addition, certain catalysts, for example, acid clays, may be destroyed by filtering the reaction mixture.

The reactions may be conducted at any temperature ranging from about 25° up to about 200° C. over a period of time ranging from 0.5 hour up to several days and, if desired, in the presence of a hydrocarbon solvent. Under certain conditions, for example, when an anhydrous acid catalyst is employed, a catalytic amount of a protic compound is required to effect the reaction. The term protic compound refers to compounds having a reactive hydrogen such as alcohols, e.g., methanol, ethanol, propanol, butanol and water. The amount of protic compound is not critical and may range from about 0.0001 to about 10 percent based on the total weight of the silane and siloxane reactants.

The reaction may be conducted in the absence of a solvent; however, when a solvent is employed, it may be employed in an amount of from about 1 to 50 percent by weight based on the silane and siloxane reactants. Examples of suitable hydrocarbon solvents are heptane, benzene, toluene, xylene and the like. Moreover, it is preferred that the reaction be conducted in an inert atmosphere.

The thiofunctional organopolysiloxanes of this invention may be used as metal protectants and as release agents on metal substrates. These compositions may be applied to metal surfaces to improve their resistance to corrosion and to high temperature oxidation. Also, these compositions are useful as coating agents and as release agents for materials such as polyurethanes.

The embodiments of this invention are further illustrated by the following examples in which all parts are by weight unless otherwise specified.

EXAMPLE 1

To a reaction vessel containing 1,276 parts of hexamethylcyclotrisiloxane heated to 70° C. are added 28.2 parts of 3-mercaptopropyltrimethoxysilane, 0.5 part of water, and 25.5 parts of Filtrol No. 13 acid clay (available from Filtrol Corporation). The vessel is heated to 100° C. and maintained at this temperature for three hours. The contents of the vessel are then cooled to 60° C. and filtered. The volatiles are stripped off for 8.0 hours at 200° C. at less than 1 torr. A clear, transparent liquid is obtained having a viscosity of 100 cs. at 25° C. Nuclear Magnetic Resonance (NMR) analysis shows that the product has a mole ratio of $CH_3O:HSC_3H_6:Si(CH_3)_2$ of 3:1:100. The SH content of the product is about 0.43 percent.

The resultant composition is applied to a copper substrate and a layer of Epoxical Urethane No. 1850 Foam "B" Pak, (available from U.S. Gypsum) is then applied to the coated substrate. Excellent release is obtained between the substrate and the urethane layer.

When a trimethylsilyl-endblocked dimethylpolysiloxane (350 cs. at 25° C.) is substituted for the thiofunctional polysiloxane prepared above, the urethane layer adheres to the coated copper substrate.

EXAMPLE 2

The process of Example 1 is repeated except that 31 parts of 2-mercaptoethyltriethoxysilane is substituted for 3-mercaptopropyltrimethoxysilane. The resultant product has a viscosity of about 95 cs. at 25° C. Nuclear Magnetic Resonance (NMR) analysis of the product shows that the ratio of $C_2H_5O:HSC_2H_5:Si(CH_3)_2$ is 3:1:96. The percent of SH in the product is about 0.41 percent.

The product exhibits excellent release properties when applied to a copper substrate as a release agent between the copper substrate and a polyurethane layer.

EXAMPLE 3

The process of Example 1 is repeated except that 38.3 parts of w-mercaptoamytriethoxysilane is substituted for 3-mercaptopropyltrimethoxysilane. The resultant product has a viscosity of 95 cs. at 25° C. Nuclear Magnetic Resonance (NMR) analysis of the product shows that the ratio of $C_2H_5O:HSC_5H_{10}:Si(CH_3)_2$ is 2.95:1.97. The percent of SH in the product is about 0.4 percent.

EXAMPLE 4

The process of Example 1 is repeated except that 48.3 parts of w-mercaptodecyltriethoxysilane is substituted for 3-mercaptopropyltrimethoxysilane. The resultant product has a viscosity of 101 cs. at 25° C. Nuclear Magnetic Resonance (NMR) analysis of the product shows that the ratio of $C_2H_5O:HSC_{10}H_{20}:Si(CH_3)_2$ is 2.9:1:102. The percent of SH in the product is about 0.39 percent.

EXAMPLE 5

The process of Example 1 is repeated except that 40.2 parts of 2-(triethoxysilyl)ethyl butyl thioether is substituted for 3-mercaptopropyltrimethoxysilane. The resultant product has a viscosity of 100 cs. at 25° C. Nuclear Magnetic Resonance (NMR) analysis of the product shows that the ratio of $CH_2O:SCH_2:Si(CH_3)_2$ is 1.3:1:50.

EXAMPLE 6

The process of Example 1 is repeated except that 39.2 parts of 3-(trimethoxysilyl)propyl phenyl thioether is substituted for 3-mercaptopropyltrimethoxysilane. The resultant product has a viscosity of 99 cs. at 25° C. Nuclear Magnetic Resonance (NMR) analysis of the product shows that the ratio of $C_6H_5:CH_3O:SCH_2:Si(CH_3)_2$ is 1:3:1:96.

EXAMPLE 7

The process of Example 1 is repeated except that 38.8 parts of 2-(methyldiethoxysilyl)ethyl phenyl thioether is substituted for 3-mercaptopropyltrimethoxysilane. The resultant product has a viscosity of 98 cs. at 25° C. Nuclear Magnetic Resonance (NMR) analysis of the product shows that the ratio of $C_6H_5:CH_2O:SCH_2:Si(CH_3)_2$ is 1:2.9:1:96.

EXAMPLE 8

The process of Example 1 is repeated except that 23 parts of compound having the formula

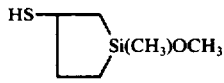

is substituted for 3-mercaptopropyltrimethoxysilane. The resultant product has a viscosity of 100 cs. at 25° C. Nuclear Magnetic Resonance (NMR) analysis of the product shows that the ratio of $CH_3O:HSCH:Si(CH_3)_2$ is 1:1:97.5. The SH content of the product is about 0.42 percent.

EXAMPLE 9

To a reaction vessel containing 1110 parts of hexamethylcyclotrisiloxane heated to 70° C. are added 141 parts of

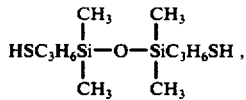

0.5 parts of water, and 25 parts of Filtrol No. 13 acid clay. The vessel is heated to 100° C. and maintained there for 3 hours. The contents of the vessel are then cooled to 60° C. and filtered. The volatiles are stripped off for 4 hours at 200° C. at less than 1 torr. A clear transparent liquid is obtained having a viscosity of 30 cs. at 25° C. Nuclear Magnetic Resonance (NMR) analysis shows that the product has a mole ratio of $HSC_3H_6:Si(CH_3)_2$ of 1 to 12. The SH content of the product is about 3.0 percent.

EXAMPLE 10

To a 1 liter reaction vessel is added 277 parts of hexamethylcyclotrisiloxane and 25 parts of toluene. The vessel is heated to 70° C., then 19.0 parts of 2-mercaptoethyltriethoxysilane, 14 parts of water, 10 parts of hexamethyldisiloxane and 6 parts of Filtrol No. 13 acid clay are added to the vessel. The reactants are heated to reflux temperature and the water and ethanol are azetroped off up to a pot temperature of about 155° C. The reactants are then cooled to room temperature and the catalyst removed by filtration. The volatiles are then stripped off for about 3 hours at 190° C. and at less than 1 torr.

About 212 parts of a clear liquid product are obtained having a viscosity of 44.1 cs. at 25° C. Nuclear Magnetic Resonance (NMR) analysis shows that the product has a mole ratio of $C_2H_5O:HSC_2H_4:Si(CH_3)_2$ of 1:1:34.8. The SH content of the product is 0.77 percent. About 20.8 parts of water-ethanol azetrope are obtained which by analysis consisted of 7.3 parts ethanol, 10.5 parts water, and 2.8 parts toluene. About 54.2 parts of volatiles are removed under stripping.

EXAMPLE 11

The procedure of Example 10 is repeated except that 16.7 parts of 3-mercaptopropyltrimethoxysilane are substituted for 2-mercaptoethyltriethoxysilane. About 196.3 parts of a clear liquid product having a viscosity of 115 cs. at 25° C. are obtained. Nuclear Magnetic Resonance (NMR) analysis shows that the product has a mole ratio of $HSC_3H_6:Si(CH_3)_2$ of 1:42. The SH content of the product is 0.72 percent.

EXAMPLE 12

The procedure of Example 10 is repeated except that 16.7 parts of 3-mercaptopropyltrimethoxysilane and 1 part of concentrated sulfuric acid are employed. Also, no water is employed. The catalyst is neutralized with 10.0 parts of sodium bicarbonate. A slightly turbid liquid is obtained which after being filtered twice has a viscosity of 150 cs. at 25° C. Nuclear Magnetic Resonance (NMR) analysis shows that the product has a mol ratio of $HSC_3H_6:Si(CH_3)_2$ of 1.0:33.3. The SH content of the product is about 0.66 percent.

EXAMPLE 13

The procedure of Example 12 is repeated except that 1 part of concentrated nitric acid is substituted for the sulfuric acid. About 170 parts of a turbid liquid are recovered having a viscosity of 418 cs. at 25° C. Nuclear Magnetic Resonance (NMR) analysis showed that the product has a mole ratio of $CH_3O:HSC_3H_6:Si(CH_3)_2$ of 1.0:1.0:52. The SH content of this product is about 0.5 percent.

EXAMPLE 14

The procedure of Example 12 is repeated except that 1.0 part of para-toluenesulfonic acid is substituted for the sulfuric acid. About 184 parts of a slightly turbid liquid are recovered having a viscosity of 364 cs. at 25° C. Nuclear Magnetic Resonance (NMR) analysis showed that the product has a mole ratio of $CH_3O:HSC_3H_6:Si(CH_3)_2$ of 0.56:1.0:42. The SH content of the product is about 0.96 percent.

EXAMPLE 15

The procedure of Example 12 is repeated except that 1 part of concentrated perchloric acid is substituted for the sulfuric acid. About 207 parts of a brown transparent liquid are recovered having a viscosity of 266 cs. at 25° C. Nuclear Magnetic Resonance (NMR) analysis shows that the product has a mole ratio of $CH_3O:HSC_3H_6:Si(CH_3)_2$ of 0.27:1.0:51.5. The SH content of the product is about 0.78 percent.

EXAMPLE 16

The procedure of Example 12 is repeated except that 2 parts of concentrated hydrochloric acid is substituted for the sulfuric acid. About 153.8 parts of a clear liquid are recovered having a viscosity of about 59.1 cs. at 25° C. Nuclear Magnetic Resonance (NMR) analysis shows that the product has a mole ratio of $CH_3O:HSC_3H_6:Si(CH_3)_2$ of 0.95:1.0:38.5. The SH content of the product is about 0.72 percent.

EXAMPLE 17

The procedure of Example 12 is repeated except that 5.6 parts of Filtrol No. 24 is substituted for the sulfuric acid and 0.5 part of water is employed. About 97 parts of a clear liquid are recovered having a viscosity of 103 cs. at 25° C. Nuclear Magnetic Resonance (NMR) analysis shows that the product has a mole ratio of $HSC_3H_6:Si(CH_3)_2$ of 1:35.6. The SH content of the product is about 0.67 percent.

EXAMPLE 18

As a comparison with Example 10, a one liter reaction vessel is charged with 277 parts octamethylcyclotetrasiloxane, 25 parts of toluene, 19 parts of 2-mercaptoethyltriethoxysilane, 14 parts of water, 10 parts of hexamethyldisiloxane, and 6 parts of Filtrol No. 13 acid clay.

The system is heated to reflux and the water and ethanol are azetroped off and collected in a dean stark head. The system is refluxed three days and after each day a sample is withdrawn and the volatiles removed. After 3 days, the contents of the reaction vessel are still volatile, indicating that no reaction has occurred.

EXAMPLE 19

To a reaction vessel containing 1276 parts of hexamethylcyclotrisiloxane heated to 70° C. are added 0.5 part of water and 398.5 parts of mercaptofunctional siloxane represented by the formula

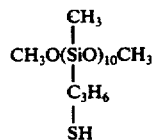

and 25 parts of Filtrol No. 13 acid clay. The vessel is heated to 100° C. and maintained at this temperature for 3 hours. The contents of the vessel are then cooled to 60° C. and filtered. The volatiles are stripped off for 3 hours at 185° C. at less than 1 torr. A clear, transparent liquid is obtained which cures to a gum like composition when exposed to the atmosphere. Nuclear Magnetic Resonance (NMR) analysis shows that the product has a mole ratio of $CH_3O:HSC_3H_6:Si(CH_3)_2$ of 0.19:1.0:5.0. The SH content of the product is about 6.0 percent.

EXAMPLE 20

A two liter vessel is charged with 1000 parts hexamethylcyclotrisiloxane, 35.4 parts of 3-mercaptopropyltrimethoxysilane and 20.7 parts Filtrol No. 13 acid clay which has been dried for 18 hours at 300° F. The system is heated 3 hours at 100° C. After the three hour period a sample is withdrawn. The entire sample solidified at room temperature indicating that the hexamethylcyclotrisiloxane which has a melting point of 64.5° C. did not polymerize. To the reaction vessel is charged about 2 parts of water and the system is heated for 3 hours at 100° C. The system is cooled to room temperature and the catalyst removed by filtration. The volatiles are removed by vacuum stripping yielding about 589 parts of a clear liquid. The product has a viscosity of 84.2 cs. at 25° C. and by Nuclear Magnetic Resonance analysis a ratio of $CH_3O:HSC_3H_6:Si(CH_3)_2$ of 1:1:35. This example illustrates the need for a protic compound to effect the reaction.

EXAMPLE 21

A 5 liter vessel is charged with 2200 parts of hexamethylcyclotrisiloxane, 150 parts of toluene, and 141 parts of 1,3-di(3-mercaptopropyl)tetramethyldisiloxane. The system is heated to 70° C. and the vessel is charged with 90 parts of 3-mercaptopropylmethyldimethoxysilane, 90 parts of water and 50 parts of Filtrol No. 13. The system is heated 3 hours at 100° C. After the three hour period the system is cooled to 60° C. and filtered. The volatiles are stripped off for 4.0 hours at 185° C. at less than 1 torr. A clear, transparent liquid is obtained having a viscosity of 60 cs. at 25° C. Nuclear Magnetic Resonance (NMR) analysis shows that the product has a mole ratio of $HSC_3H_6:Si(CH_3)$ of 1:16.5. The SH content of the product is about 2.1 percent.

EXAMPLE 22

The procedure of Example 21 is repeated except that 60 parts of dimethyldimethoxysilane and 1 part of water are employed. A clear, transparent liquid is obtained having a viscosity of 30 cs. at 25° C. Nuclear Magnetic Resonance (NMR) analysis shows that the product has a mole ratio of $CH_3O:HSC_3H_6:Si(CH_3)_2$ of 2:1.0:30. The SH content of the product is about 1.4 percent.

Although the reactions in the above examples were conducted at atmospheric pressure (approx. 760 mm Hg ), the reactions may be conducted at superatmospheric pressures. Moreover, it is not intended to limit the invention solely to the specific examples described above, but to include all the variations and modifications falling within the scope of the appended claims.

What is claimed is:

1. A method for preparing thiofunctional polysiloxane polymers which comprises reacting in the presence of a catalyst having a pK value below 1.0 a cyclic trisiloxane with a silicon compound selected from the class consisting of silanes of the formula

and siloxanes of the formula

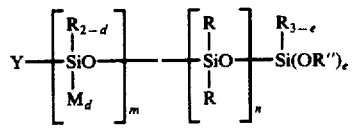

in which the cyclic trisiloxane or silicon compound contains at least one thiol group, R is selected from the group consisting of a monovalent hydrocarbon radical and a halogenated monovalent hydrocarbon radical, each having from 1 to 18 carbon atoms, M is selected from the class consisting of $R'(SR''')_y$ and

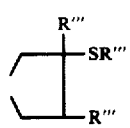

R' is selected from the group consisting of substituted and unsubstituted divalent, trivalent and tetravalent hydrocarbon radicals free of aliphatic unsaturation having from 1 to 18 carbon atoms, hydrocarbon ether, hydrocarbon thioether, hydrocarbon ester and hydrocarbon thioester radicals in which R' is attached to a silicon atom via a silicon-carbon bond, R" is selected from the group consisting of hydrogen and a monovalent hydrocarbon radical having from 1 to 18 carbon atoms, R'" is selected from the group consisting of R" and a radical represented by the formula R""X, wherein X is a radical selected from the group consisting of

and a cyanoalkyl radical, in which R"" is a divalent hydrocarbon radical free of a aliphatic unsaturation having from 1 to 18 carbon atoms, Y is a radical selected from the class consisting of $R_3SiO_{1/2}$, $RC=O$ and

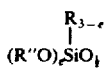

where R and R" are the same as above, $b$ is a number of from 0 to 3, $c$ is a number of from 0 to 3 and the sum of $b+c$ is a number up to 3, $d$ is a number of from 0 to 2, $e$ is a number of from 1 to 3, $m$ and $n$ are each equal to a number of from 0 to 999 and the sum of $m+n$ is at least 1 and $y$ is a number of from 1 to 3.

2. The method of claim 1 wherein a mixture containing a cyclic trisiloxane and an organodisiloxane is reacted with a silicon compound selected from the class consisting of silanes of the formula

and siloxanes of the formula

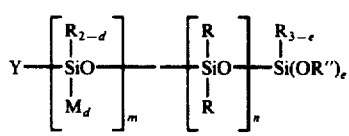

in which the cyclic trisiloxane, or disiloxane or silicon compound contains at least one thiol group, R is selected from the group consisting of a monovalent hydrocarbon radical and a halogenated monovalent hydrocarbon radical, each having from 1 to 18 carbon atoms, M is selected from the class consisting of $R'(SR''')_y$ and

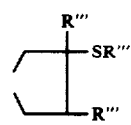

R' is selected from the group consisting of substituted and unsubstituted divalent, trivalent and tetravalent hydrocarbon radicals free of aliphatic unsaturation having from 1 to 18 carbon atoms, hydrocarbon ether, hydrocarbon thioether, hydrocarbon ester and hydrocarbon thioester radicals in which R' is attached to a silicon atom via a silicon-carbon bond, R" is selected from the group consisting of hydrogen and a monovalent hydrocarbon radical having from 1 to 18 carbon atoms, R'" is selected from the group consisting of R" and a radical represented by the formula R""X, wherein X is a radical selected from the group consisting of

and a cyanoalkyl radical, in which R"" is a divalent hydrocarbon radical free of aliphatic unsaturation having from 1 to 18 carbon atoms, Y is a radical selected from the class consisting of $R_3SiO_{1/2}$, $RC=O$ and

where R and R" and the same as above, $b$ is a number of from 0 to 3, $c$ is a number of from 0 to 3 and the sum of $b+c$ is a number up to 3, $d$ is a number of from 0 to 2, $e$ is a number of from 1 to 3, $m$ and $n$ are each equal to a number of from 0 to 999 and the sum of $m+n$ is at least 1 and $y$ is a number of from 1 to 3.

3. The method of claim 1 wherein the organodisiloxane is represented by the formula

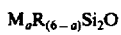

wherein R is selected from the group consisting of a monovalent hydrocarbon radical and a halogenated hydrocarbon radical, each having from 1 to 18 carbon atoms, $a$ is a number of from 0 to 6, M is selected from the class consisting of $R'(SR''')_y$ and

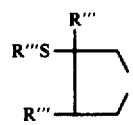

wherein R' is selected from the group consisting of substituted and unsubstituted divalent, trivalent and tetravalent hydrocarbon radicals free of aliphatic unsaturation having from 1 to 18 carbon atoms, hydrocarbon ether, hydrocarbon thioether, hydrocarbon ester and hydrocarbon thioester radicals, in which R' is attached to a silicon atom via a silicon-carbon bond, R'" is selected from the group consisting of hydrogen, a monovalent hydrocarbon radical having from 1 to 18 carbon atoms and a radical represented by the formula R""X, wherein X is a radical selected from the group consisting of

and a cyanoalkyl radical, in which R""is a divalent hydrocarbon radical free of aliphatic unsaturation having from 1 to 18 carbon atoms and $y$ is a number of from 1 to 3.

4. The method of claim 1 wherein the cyclic trisiloxane is represented by the formula

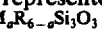

wherein R is selected from the group consisting of a monovalent hydrocarbon radical and a halogenated hydrocarbon radical, each having from 1 to 18 carbon atoms, $a$ is a number of from 0 to 6, M is selected from the class consisting of $R'(SR''')_y$ and

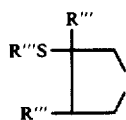

wherein R' is selected from the group consisting of substituted and unsubstituted divalent, trivalent and tetravalent hydrocarbon radicals free of aliphatic unsaturation having from 1 to 18 carbon atoms, hydrocarbon ether, hydrocarbon thioether, hydrocarbon ester and hydrocarbon thioester radicals, in which R' is attached to a silicon atom via a silicon-carbon bond, R''' is selected from the group consisting of hydrogen, a monovalent hydrocarbon radical having from 1 to 18 carbon atoms and a radical represented by the formula R''''X, wherein X is a radical selected from the group consisting of

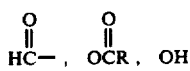

and a cyanoalkyl radical, in which R'''' is a divalent hydrocarbon radical free of aliphatic unsaturation having from 1 to 18 carbon atoms and $y$ is a number of from 1 to 3.

5. The method of claim 1 wherein the reaction is conducted in the presence of a hydrocarbon solvent.

6. The method of claim 4 wherein the solvent is toluene.

7. The method of claim 1 wherein the reaction is conducted at a temperature up to 200° C.

8. The method of claim 1 wherein the reaction is conducted in the presence of a protic compound.

9. The method of claim 8 wherein the protic compound is water.

10. The method of claim 8 wherein the protic compound is an alcohol.

11. The method of claim 2 wherein the organodisiloxane is hexamethyldisiloxane.

12. The method of claim 2 wherein the disiloxane is di(3-mercaptopropyl)tetramethyldisiloxane.

13. The method of claim 1 wherein the cyclic trisiloxane is hexamethylcyclotrisiloxane.

14. The method of claim 1 wherein the silicon compound is a mercaptoalkyltrihydrocarbonoxysilane.

15. The method of claim 14 wherein the silicon compound is a mercaptoalkyltrialkoxysilane.

16. The method of claim 14 wherein the silicon compound is beta-mercaptoethyltriethoxysilane.

17. The method of claim 14 wherein the silicon compound is a mercaptoalkyltrialkoxysilane.

18. The method of claim 1 wherein the silicon compound is a thioether alkyltrialkoxysilane.

19. The method of claim 1 wherein the silicon compound is obtained from the hydrolysis of a thiol containing silane.

20. The method of claim 19 wherein the silicon compound is obtained from the hydrolysis of 3-mercaptopropyltrimethoxysilane.

21. The method of claim 19 wherein the silicon compound is obtained from the hydrolysis of beta-mercaptoethyltriethoxysilane.

22. Thiofunctional polysiloxanes prepared in accordance with claim 1.

* * * * *